United States Patent Office 3,344,909
Patented Oct. 3, 1967

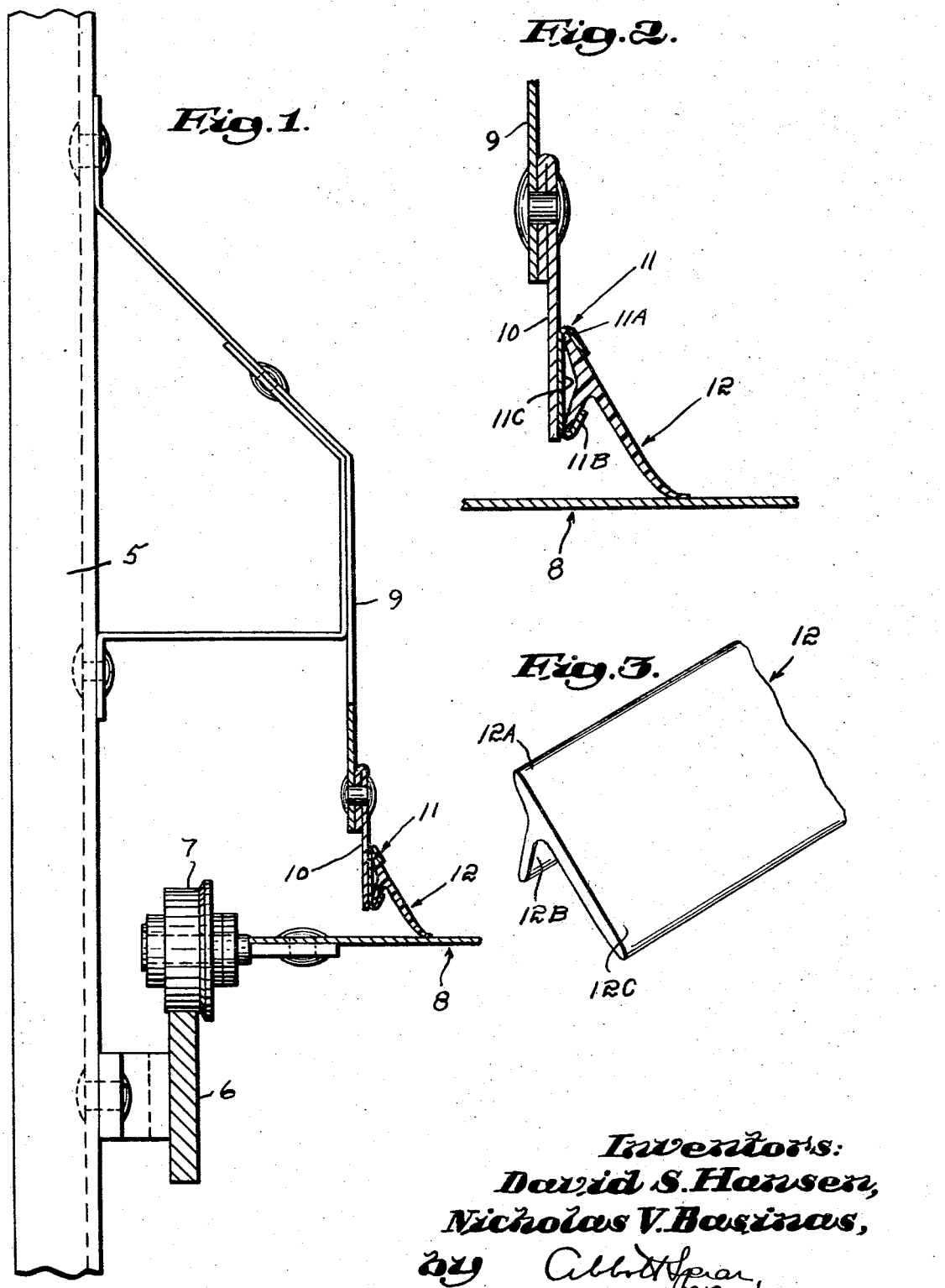

3,344,909
CONVEYOR SEALS
David S. Hansen, Shirley, and Nicholas V. Basinas, Westford, Mass., assignors to C. G. Sargent's Sons Corp., Graniteville, Mass., a corporation of Massachusetts
Filed Sept. 8, 1965, Ser. No. 485,831
8 Claims. (Cl. 198—204)

ABSTRACT OF THE DISCLOSURE

Apparatus having a treating chamber, a conveyor extending therethrough, a channel at each side of the chamber providing a lengthwise entrance and upper and lower portions receiving and retaining upper and lower flexible wing portions of a seal having a conveyor engaging portion disposed at an acute angle relative to a plane inclusive of the extremities of the wing portions.

---

The present invention relates to apparatus for treating loose material being carried on a conveyor through a chamber and particularly to the sealing of the spaces between the stock guards and the conveyor.

In various industries, loose material is processed while being conveyed through a chamber, typically the processing being effected by conditioned air streams with drying the most common objective. It is, of course, essential that the material be retained on the conveyor while it is being treated and, for that purpose, the chambers have been provided with members secured to each side thereof, typically stock guards, first of the type provided with flexible, conveyor engaging seals and, later, of the type provided with seals engaging the sides of stock guides mounted on the margins of the conveyors.

The present invention has, as its general objective, the provision of seals of the stock guards to conveyor type that are free from the objectionable feature that the flexible seals became so quickly worn by their engagement with the moving conveyor as to fail. It was this feature that lead to the use of longer wearing seals, brake lining, for example, used between the adjacent faces of stock guards and stock guides. This basis of sealing lacked flexibility and was not sufficiently effective to meet all requirements, partly because of costs including the cost of the stock guides and the cost of service and partly because the seals, lacking flexibility, leaked in response to slight side-to-side movements of the conveyor and because slight misalinement of the stock guards relative to the conveyor are usual.

In accordance with the invention, the objective is attained by providing apparatus in which the chamber through which the conveyor extends has stock guards above the conveyor and at each side thereof. Each stock guard includes a channel close to an appropriate one of the conveyor edges to support a seal including a portion held in the channel and a downwardly and inwardly inclined, flexible, resilient portion in engagement with the upper surface of the conveyor and dimensioned to be curved and tensioned by such engagement with at least the conveyor-engaging portion of the seal being elastomeric and having a coefficient of friction and resistance to heat in the order of those characteristics of silicone rubber, impregnated with polytetrafluoroethylene.

Such a seal, while resistant to wear, must, of course, be replaced from time-to-time and another objective of the invention is to provide seals that may be easily removed and replaced. This objective is attained by providing stock guard channels with marginal flanges turned inwardly towards each other and providing a longitudinal entrance slot and the seals each with a first portion having two wings that can be folded together sufficiently to permit their entry through the entrance and then worked under the flanges, the wings being dimensioned to be then tensioned to provide resistance against movement lengthwise of the channel in response to the pull of the conveyor.

In the accompanying drawings, there is shown an illustrative embodiment of the invention from which these and other of its objectives, novel features, and advantages will be readily apparent.

In the drawings:

FIGURE 1 is a fragmentary and partly sectioned view of one side of a treating chamber showing the space between the stock guard and a conveyor sealed in accordance with the invention, FIGURE 2 is a similar view but showing the seal in substantially full scale, and FIGURE 3 is a fragmentary perspective view of the seal on the scale of FIGURE 2.

In FIGURE 1, an upright 5 at one side of a treating chamber has a flat strip or bar 6 attached in spaced relationship thereto to provide a run or track for the flanged wheels 7 rotatably supported along one side of a generally indicated conveyor 8. The conveyor 8 has like wheels along its other side for engagement with a similarly supported, transversely alined track extending along the other side of the chamber. As the chamber and conveyor may be of any type neither is shown in detail but reference is made to the co-pending application of Robert D. Lambert and David S. Hansen, Ser. No. 264,517, filed Mar. 12, 1963 for a more complete showing thereof.

At each side of the chamber there is a stock guard 9 such as the stock guard above the conveyor 8 and adjacent the corresponding edge thereof. The lower edge of the stock guard 9 is shown as having a strip 10 secured thereto and extending close to the upper surface of the conveyor 8. The extension strip 10 is provided, on its inner face with a seal holder in the form of a channel generally indicated at 11 and having flanges 11A and 11B inclined outwardly towards each other to define an acute angle of approximately 25° with reference to the channel wall 11C.

A channel seal is generally indicated at 12 and its made of a suitable elastomeric material that is suitably flexible, resilient and resistant to wear. In addition, since drying is a commonly practiced process, the seals must be resistant to whatever elevated temperatures are to be encountered. Silicone rubber impregnated with polytetrafluoroethylen has proved satisfactory for seal materials in all such respects including a low coefficient of friction, ensuring wear resistance over long periods.

The seal 12 is shown as including a pair of retaining wings 12A and 12B dimensioned for entry into a channel 11 and a conveyor engaging and sealing portion 12C. The wings define an angle of approximately 145° and are sufficiently flexible to enable them to be so folded together as to enable them to be entered into the channel 11 through the entrance slot defined by its inturned flanges 11A and 11B. The wing 12A and the conveyor engaging portion 12C are shown as defining an angle of 180° and the portion 12C is so dimensioned that, when the wings are caught in the channel 11 by its flanges 11A and 11B, then it engages with and is flexed and tensioned by such engagement with the upper surface of the conveyor 8. The portion 12C extends downwardly and inwardly at an angle relative to the vertical defined by the channel wall 11C, the angle being, with the seal shown in the drawing about 25°. The portion 12C is of a width greater than the edge to edge distance of the wing portions, the plane inclusive of which, when a seal is installed, being normal to the conveyor.

This construction of the seal has the advantage that a worn seal may be stripped from its holding channel 11 as by pulling it more or less at right angles thereto. A replacement seal may be inserted by successively folding short lengths of its wings 12A and 12B together introducing the thus folded lengths between the flanges 11A and 11B and repeating the procedure throughout the length of the treating chamber.

The wear resisting qualities of the seals has the disadvantageous features that the low coefficient of friction creates the problem of insuring that the seals are not pulled endwise in response to the travel of the conveyor, particularly when the conveyor supports a substantial depth of the material. Satisfactory anchoring of the seals results when the wings 12A and 12B are so dimensioned relative to their holder 11 that they are forced into resilient contact with the flanges 11A and 11B when entered therein with any downward pull increasing the frictional engagement of the seals with their holders.

It will be appreciated that the invention provides simple but effective seals that are well adapted to provide long and effective service while admitting of ease and convenience in seal removal and replacement.

We claim:

1. In apparatus for treating loose material, a treating chamber, a conveyor extending through said chamber, stock guards, one for each side of the chamber and secured thereto above said conveyor, each stock guard including a lengthwise channel having margins turned inwardly towards each other defining upper and lower portions and an intermediate lengthwise entrance, the channel entrances facing each other, and elastomeric seals, one for each channel, each seal including upper and lower, flexible retaining wing portions of substantial length, and a flexible resilient conveyor engaging and sealing portion downwardly and inwardly inclined at an acute angle with reference to a plane inclusive of the edges of said wing portions and of a length greater than that of at least the lower wing portion, the edge-to-edge distance of said wing portions being greater than the maximum width of the channels, each of said portions including a section whose width is greater than its thickness, each seal having a coefficient of friction and resistance to heat in the order of that of Teflon impregnated silicone rubber.

2. The apparatus of claim 1 in which the wing portions define an obtuse angle with respect to the plane and the upper wing portion defines an angle of approximately 180° with the conveyor engaging and sealing portion.

3. The apparatus of claim 2 in which the obtuse angle defined by the wing portions is approximately 145°.

4. The apparatus of claim 1 in which the acute angle defined by the plane and the conveyor engaging and sealing portion is approximately 25°.

5. The apparatus of claim 1 in which the wing portions are of approximately the same width.

6. The apparatus of claim 1 in which the zones of all the portions are of approximately the same thickness.

7. The apparatus of claim 1 in which the conveyor engaging and sealing portion is wider than the edge to edge distance of the wing portions.

8. The apparatus of claim 1 in which the plane inclusive of the edges of the wing portions is normal to the conveyor.

References Cited

UNITED STATES PATENTS

| | | | |
|---|---|---|---|
| 1,763,603 | 6/1930 | Donahue | 49—489 |
| 2,883,035 | 4/1959 | Erisman | 198—184 |
| 2,909,815 | 10/1959 | Campo | 49—493 |

EVON C. BLUNK, *Primary Examiner.*

R. E. AEGERTER, *Assistant Examiner.*